Jan. 14, 1941.　　　P. E. MERCIER　　　2,228,638
AIRSCREW SYSTEM
Filed July 25, 1939　　　4 Sheets-Sheet 1
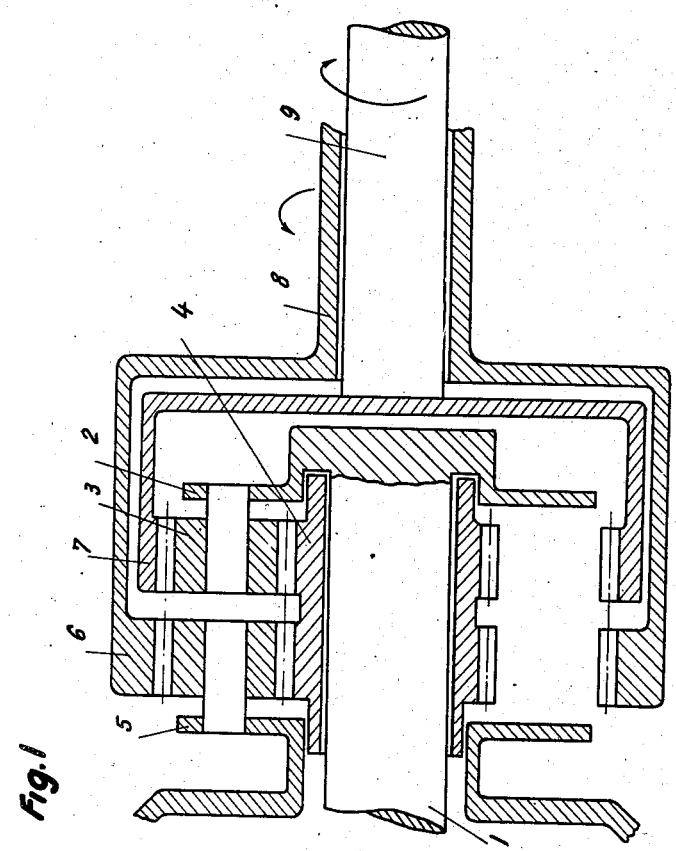
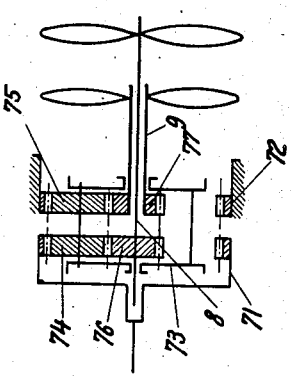
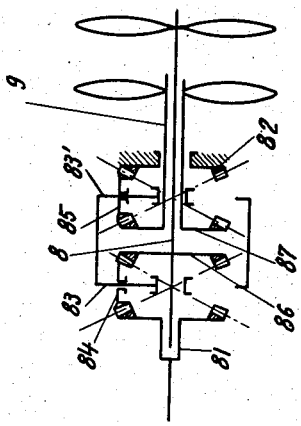
INVENTOR:
PIERRE ERNEST MERCIER
By Haseltine, Lake & Co.
ATTORNEYS

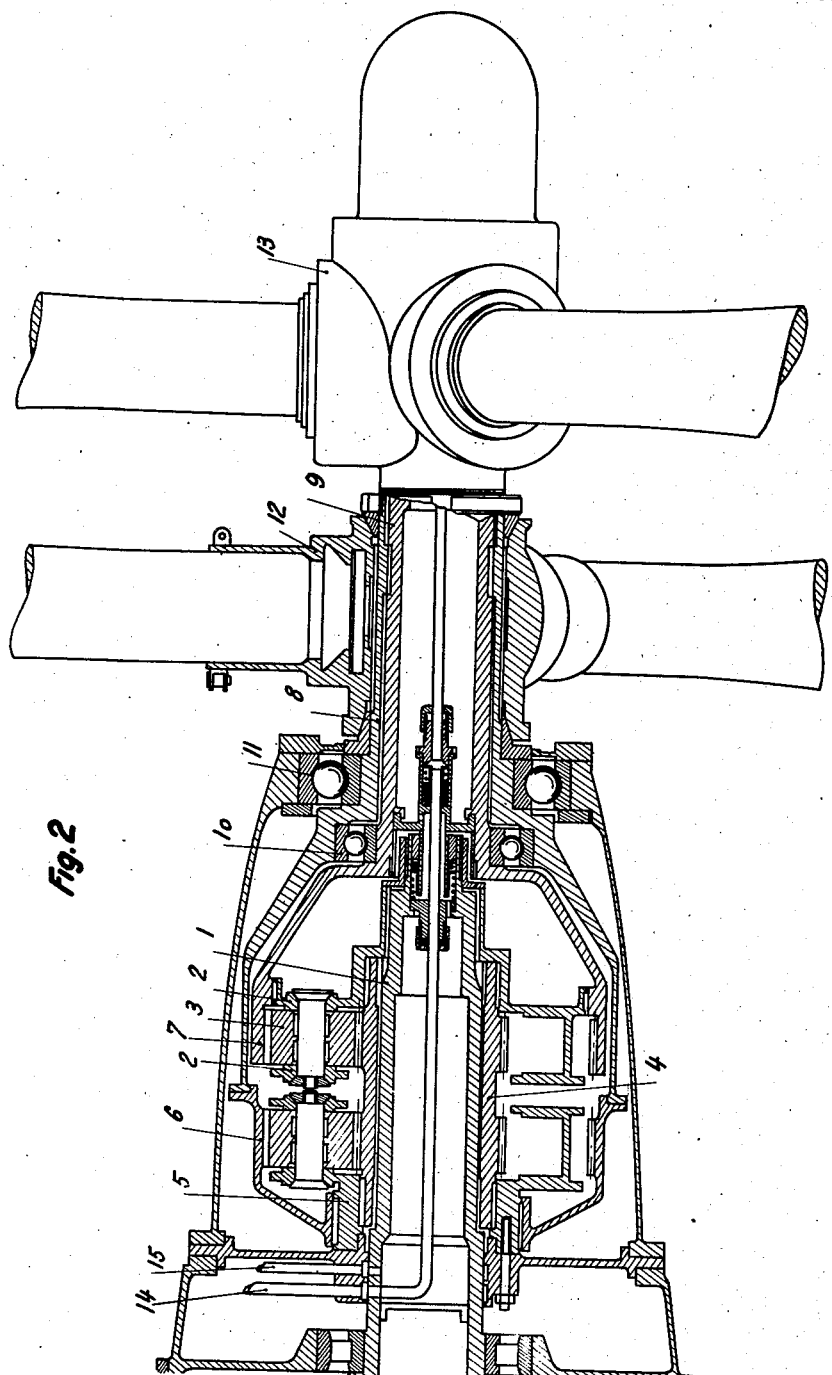

Jan. 14, 1941.  P. E. MERCIER  2,228,638
AIRSCREW SYSTEM
Filed July 25, 1939  4 Sheets-Sheet 3
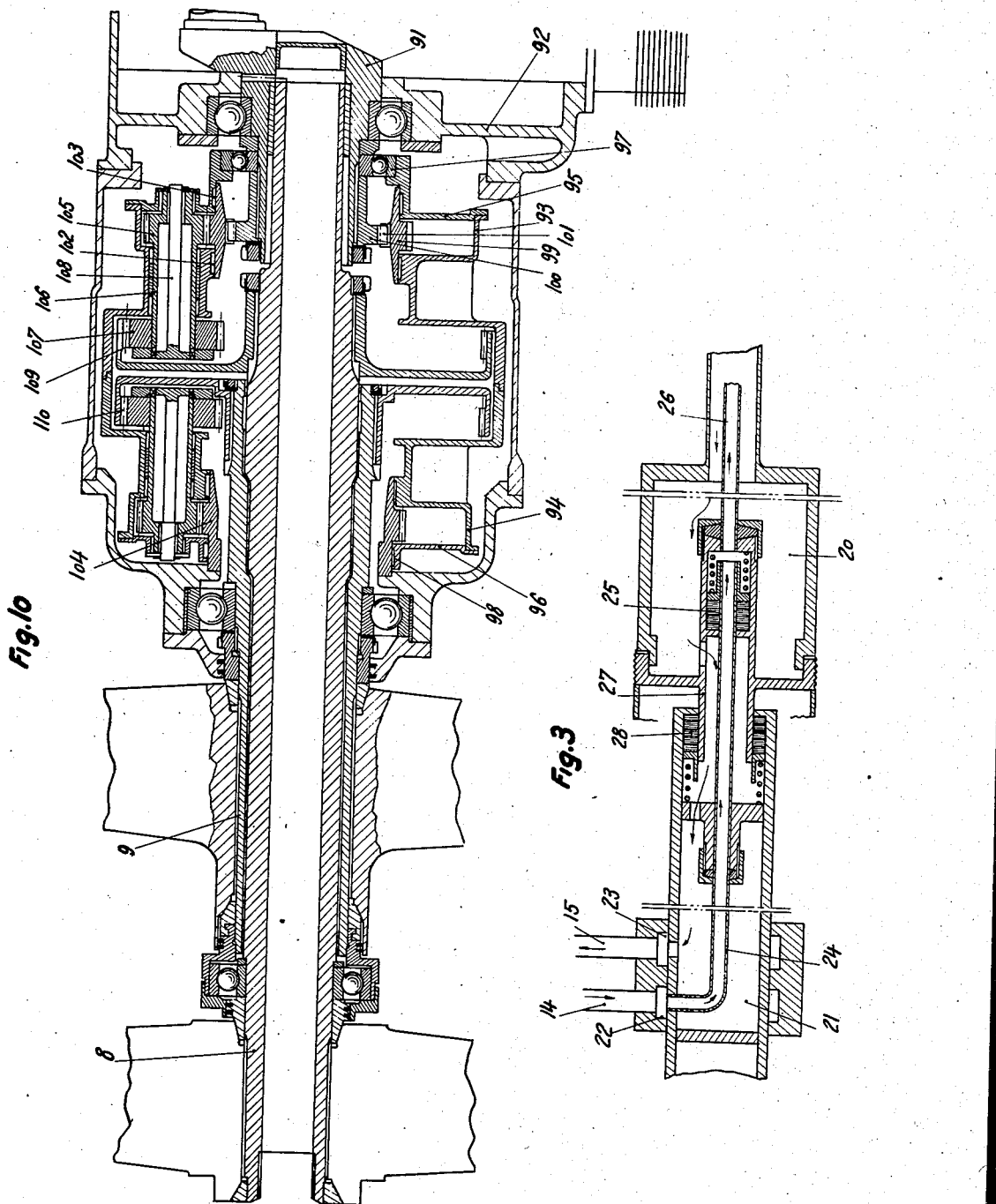
INVENTOR:
PIERRE ERNEST MERCIER
By Haseltine Lake & Co
ATTORNEYS Jan. 14, 1941.  P. E. MERCIER  2,228,638
AIRSCREW SYSTEM
Filed July 25, 1939  4 Sheets-Sheet 4
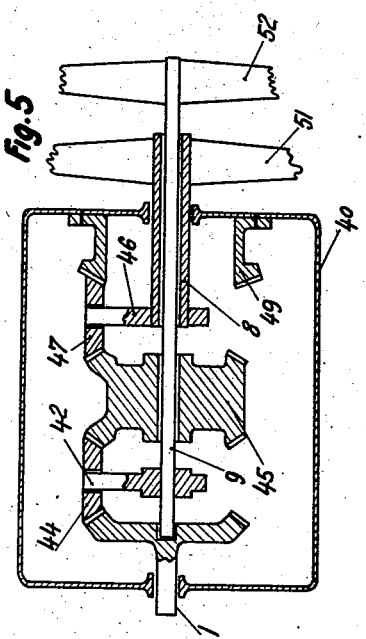
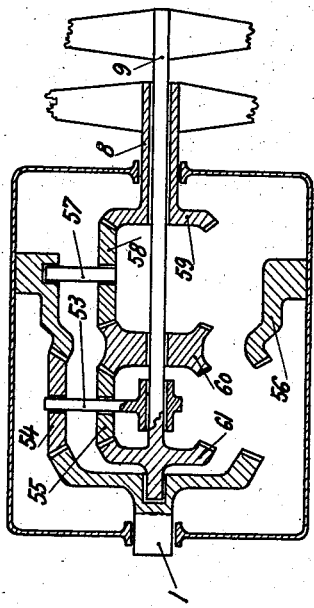
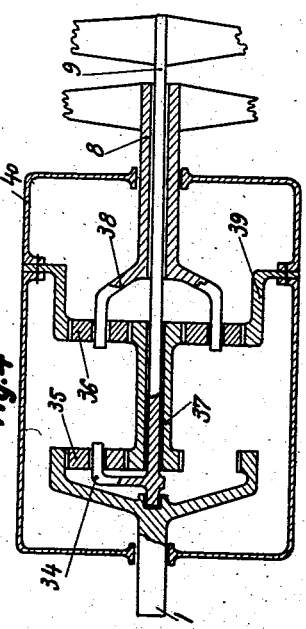
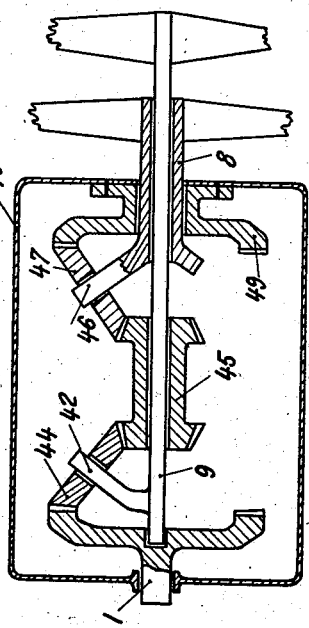
INVENTOR:
PIERRE ERNEST MERCIER
BY Haseltine Lake & Co.
ATTORNEYS Patented Jan. 14, 1941

2,228,638

UNITED STATES PATENT OFFICE 2,228,638

AIRSCREW SYSTEM

Pierre Ernest Mercier, Neuilly-sur-Seine, Seine, France

Application July 25, 1939, Serial No. 286,329
In France August 17, 1938

2 Claims. (Cl. 74—305)

The invention relates to airscrew systems comprising two co-axial airscrews having a zero reaction couple, the motor shaft and the assembly of the two shafts carrying the airscrews being arranged in line with one another. Such an arrangement is of particular advantage in the case of aircraft engines having the cylinders arranged in star formation and engines having several blocks of cylinders.

According to one broad aspect, the invention consists in a reduction mechanism comprising in combination two symmetrical trains of straight or bevel gears, in which the torque of the motor and the reaction of the casing are equal and opposite and are transmitted by the corresponding gears or satellite carriers in each of the trains, the equal and opposite torques applied to the concentric airscrew shafts being transmitted in the same manner to the latter by the corresponding gears or satellite carriers of the two trains, the remaining gears of the said trains being connected together or being integral and being freely rotatably mounted.

The hereinafter described figures of the annexed drawings illustrate different embodiments of airscrew systems in accordance with the invention:

Figure 1 illustrates diagrammatically the parts of the reduction mechanism in which the torque of the motor and the reaction torque are applied to the satellite carriers;

Figure 2 illustrates a section of a complete reduction mechanism, constructed in accordance with Figure 1, with the airscrews;

Figure 3 illustrates on a larger scale a detail of Figure 2;

Figure 4 illustrates a reduction mechanism wherein the motor torque and the reaction torque are applied to exterior gears;

Figure 5 illustrates a variation of the construction according to Figure 4, utilizing bevel toothed pinions, the axes of the satellites being perpendicular to the axis of the system;

Figure 6 illustrates a similar system in which the axes of the satellites are inclined to the axis of the system;

Figure 7 illustrates a variation with two systems of satellites mounted freely on the same satellite carrier;

Figure 8 illustrates a reduction mechanism similar to that illustrated in Figure 4, but in which the functions of the satellites and the internal gears have been reversed, normal straight toothed gears being employed, whilst Figure 9 illustrates a corresponding reduction mechanism employing bevel gears;

Figure 10 illustrates a reduction mechanism in which the motor torque and the reaction torque are applied to internal gears.

The mechanisms according to Figures 1 to 3 produce a low gear ratio, the inversion of the movement and the balancing of the couples of the airscrew by means of gears distributed in two identical and co-axial trains, each comprising an internal pinion and an arrangement of satellites themselves disposed within a gear having internal teeth.

The two internal pinions of each of these trains are thus integral with one another.

The cage of the satellites of one of the trains is secured to the motor shaft. The other cage is stationary or prevented from rotation by an elastic connection, damped or not, arranged between the cage and the casing of the reduction mechanism. It could also be rendered immobile by means of a stop.

Each of the airscrew shafts is secured to one of the gears having internal teeth.

The change of pitch of one of the airscrews may, moreover, be subordinated to the conditions of operation of the other airscrew by means of direct subjection or with the introduction of motive power.

The pitch of the front airscrew can also be controlled by a known pitch control mechanism in use on the motor actuated propellers usually employed with a single airscrew.

Finally, it is readily possible, by release of the train of gears which is normally stationary relatively to the casing to render the two airscrews independent of the motor shaft, in other words to render them "free," in order to reduce, as is well known, the resistance which they offer to travel when flying with their driving motor not operating. This last arrangement is of great importance in the case of multi-engine aircraft.

This liberation of the airscrews may be obtained by freeing a catch, by releasing a brake, or by any other appropriate means.

In Figure 1, the motor shaft I drives the satellite carrier 2, one of the satellites being indicated at 3.

The central pinions of the two gear trains are integral and constitute the member 4.

The second satellite carrier 5 is secured stationarily to the casing or elastically connected thereto.

The exterior gears 6 and 7 drive the airscrew shafts 8 and 9.

Since the two gear trains are identical, the torques applied to the shafts 8 and 9 are equal and opposite, whatever the direction of rotation of the motor shaft.

In Figure 2 similar parts are designated by the same reference numerals.

Ball bearings 10 and 11 take up the traction of the airscrews and convey it to the casing of the reduction mechanism. 12 indicates the hub of the rear airscrew which is of fixed pitch. 13 indicates the hub of the front airscrew, the pitch of which is controllable. Tubes 14 and 15 are arranged in the casing for the liquid for controlling the changing of the pitch of the front airscrew.

In the construction illustrated in Figure 3, the chamber 20 is integral with the hub of the front airscrew; the chamber 21 is integral with the motor shaft and, by means of the port 23, communicates with the tubing 15 secured to the casing.

The tube 14, by means of the port 22, communicates with the tube 24, inside the motor shaft, which communicates with the tube 26, inside the front airscrew shaft, the tube 24 extending through the stuffing box 25. The chambers 21 and 20 are connected by the cylindrical extension 27, rotatably mounted in the stuffing box 28.

The object of Figures 4 to 7 is to illustrate the general methods of construction, ensuring the equality of the torques in accordance with the invention, for obtaining gear reductions greater than or equal to 1:2, whilst the constructions already described, particularly in the case where the airscrew shafts and the motor shaft are, as shown in Figures 1 and 2, arranged in line with one another, only allow smaller gear reductions.

The mechanism according to Figure 4 comprises in a casing 40, independently manufactured but fixed on the motor casing, or manufactured in one piece with said casing, a driving shaft 1 secured to a toothed crown engaging with satellites, such as 35, the satellite carrier 34 being keyed on the shaft 9 of one of the airscrews.

The satellite carrier 38 is secured to the shaft 8 carrying the other airscrew, its satellites, such as 36, gear on the one hand with the toothed crown secured to the fixed casing 39, and on the other hand with a double central gear 37 forming a part of the two twin planetary trains.

The torque of the motor, instead of being applied to a satellite carrier, as in the case of Figure 1, is applied to one of the internally toothed gear crowns, whilst the reaction torque on the casing is transmitted thereto by the second internally toothed gear crown.

Whilst in the preceding construction the airscrews were respectively secured to rotate with the two internally toothed gears, in the present case, the two airscrews are driven by the two satellite carriers of the mechanism. As in the preceding constructions, the central gears are integral with one another and mounted freely in the mechanism.

The ratio of the arithmetic mean of the speeds of rotation of the airscrews and the speed of the driving motor shaft depends upon the respective diameters of the gears and is always less than 1:2, whilst in the preceding case it was always greater than this limit.

The same principle of construction may be employed when using bevel pinions.

Figure 5 illustrates a construction corresponding to the embodiment with not inclined satellite carriers.

The driving shaft 1 is integral with a conical toothed crown gearing with satellites, such as 44, of which the satellite carrier 42 is secured to rotate with the shaft 9 of the airscrew 52. The satellites 44 gear on the other hand with a double gear 45 mounted freely on the shaft 9 and which in turn gears with the satellites 47, the satellite carrier shaft 46 of which is secured to rotate with the shaft 8 of the airscrew 51.

The satellites 47 also gear with the toothed crown 49 secured to the fixed casing 40.

The motor torque is applied to the shaft 1, whilst the reaction to the torque of the motor is transmitted to the casing 40 by the gear 49. It can be readily demonstrated that the forces applied to the satellite carriers 42 and 46, are, as in the construction illustrated in Figure 4, equal in absolute value and opposite in direction, if the gears and their diameters are symmetrical in relation to the double gear 45.

The ratio of the mean gear reduction is in this case equal to 1:4. It is possible to obtain different reduction gear ratios, greater or smaller than this value by symmetrically inclining the axes of the satellites on the satellite carriers.

For example, Figure 6 illustrates the case of a reduction mechanism with a mean reduction ratio greater than 1:4 and of the order of 1:3. The references on this figure are the same as in Figure 5 and another explanation is unnecessary.

Finally, in order to obtain definitely a reduction ratio of 1:2, one of the embodiments already described may be simplified by mounting the two systems of satellites freely on the same satellite carrier. This has been diagrammatically illustrated in Figure 7.

The driving shaft 1 is integral with a toothed crown which gears with the satellites, such as 54, which react on the toothed crown 56 secured to the casing. The satellite carrier 53 also carries other satellites, such as 55, which gear on the one hand with a pinion 61 carried by the airscrew shaft 9, and on the other hand with the double gear 60 mounted freely on the shaft 9. The gear 60, by means of its second set of teeth, gears with the satellites 58, the axes of which, such as 57, being rigidly secured to the fixed casing.

The satellites, such as 58, engage on the other hand with a pinion 59 secured to the shaft 8 of the second airscrew. The satellite carrier 53 is driven by the shaft 1 at half the motor speed, and the satellites 55 cause equilibrium of the torque between the shaft 9 and the double gear 60, which through the reversing gearing 58 drives the second airscrew in the desired direction.

It will be understood that all the mechanisms described may form an integral part of the motor casing or constitute separate units, mounted flexibly or rigidly on extended walls of the motor, or rigidly on a special framework, the motor torque being transmitted from the motor shaft to the shaft entering the reduction mechanism by means of a rigid or flexible coupling.

According to an embodiment illustrated more particularly in Figures 8 and 9, the satellite carriers may perform the function of the coupled gears of the preceding examples.

This arrangement has the advantage of providing scales of reduction complementary to the other examples already given, and in particular allows of obtaining with bevel pinions and not inclined satellite carriers the reduction ratio of 1:2.

Figure 8 corresponds to the case where cylindrical pinions are employed. The motor torque is applied to an internally toothed gear 71.

The reaction to the fixed casing is transmitted by an identical gear 72. The satellite carrier 73, mounted freely in the mechanism, carries satellites, such as 74 and 75, which are not keyed on their common axle. The inner gears 76 and 77 are respectively secured to the airscrew shafts 8 and 9.

Figure 9 illustrates the use of bevel pinions. The motor torque is applied to the gear crown 81: the reaction on the fixed casing is transmitted by the gear crown 82. The satellite carriers of the two planetary systems 83 and 83' are freely mounted and connected to one another; their pinions, such as 84 and 85 gear with the gear crowns 81 and 82 on the one hand and with the opposite gear crowns 86 and 87 on the other hand, which are respectively secured to the airscrew shafts 8 and 9.

It will be understood that in the case of Figure 9, on inclining inwardly or outwardly the axes of the satellite pinions it is possible to vary the mean reduction ratio of the mechanism. The same result can be obtained, in the case of Figure 8, by varying the ratio of the diameters of the cylindrical gears and their satellites.

The construction according to Figure 10 illustrates that without exceeding the scope of the invention it is possible:

(1) To transfer the function of the inner gears to the satellites and the internally toothed gears;

(2) More generally, to obtain special reduction ratios, it is possible to engage one or the other of the gears with double satellites, each elementary satellite of such coupled pinions being in engagement with one or the other of the inner gears and the internally toothed gears;

(3) In order to obtain on the other hand a certain flexibility in the drive of the airscrews, the satellite pinions of each pair may be connected to rotate together by a flexible connection, for example, of the torsion bar type.

In Figure 10 the end of the crank shaft is illustrated at 91 and the motor casing at 92. The freely mounted cage of the satellite carriers comprises two twin pieces 93 and 94, and the closing plates 95 and 96, the whole being centred on the ball bearing 97 and the needle bearing 98. The part 91 carries the keyed-on sleeve 100 which, by a toothed ring 101, sets in rotation a central motor gear 99, guided in the cage of the satellite carriers by the needle rollers 102—103. The other inner gearing 104 is stationary and integral with the fixed casing.

Each double satellite is formed as follows:
It comprises a pinion 105 and an extension 106 thereof on which is centred another pinion 107, a torsion bar 108 connects for rotation the pinions 105 and 107.

The pinions, such as 107, drive the airscrew shafts 8 and 9 by means of the internally toothed gears 109 and 110.

What I claim as my invention and desire to secure by Letters Patent of the United States is:

1. Mechanism for the transmission of movement between the shaft of an aircraft motor and two airscrews rotating in opposite directions and mounted on two co-axial shafts arranged in line with the motor shaft, comprising a system of gears composed of two symmetrical trains, each train comprising at least three elements corresponding respectively with elements of the other train, one of these elements being formed by a satellite system, means for applying the torque of the motor shaft to an element of one train belonging to a first pair of corresponding elements, means for connecting through a flexible connection to a fixed point in relation to the motor the element of the second train belonging to the said first pair, means for the transmission to the airscrew shafts of the forces of a second pair of corresponding elements, and means for connecting together the corresponding elements other than those which belong to the two above-mentioned pairs, these elements which are connected together being mounted in such a manner as to rotate freely around the axis of the airscrew shafts.

2. Mechanism for the transmission of movement between the shaft of an aircraft motor and two airscrews rotating in opposite directions and mounted on two co-axial shafts arranged in line with the motor shaft, comprising a system of gears composed of two symmetrical trains, each train comprising at least three elements corresponding respectively with elements of the other train, one of these elements being formed by a satellite system composed of several pinions connected together through an elastic connection, means for applying the torque of the motor shaft to an element of one train belonging to a first pair of corresponding elements, means for connecting to a fixed point in relation to the motor the element of the second train relating to the said first pair, means for the transmission to the airscrew shaft of the forces of a second pair of corresponding elements, and means for connecting together the corresponding elements other than those which relate to the two above-mentioned pairs, these elements which are connected together being mounted in such a manner as to rotate freely around the axis of the airscrew shafts.

PIERRE ERNEST MERCIER.